US011321142B2

(12) United States Patent
Srinivasan et al.

(10) Patent No.: US 11,321,142 B2
(45) Date of Patent: May 3, 2022

(54) NOSQL DATABASE CAPACITY CONFIGURATION OPTIMIZATION SYSTEM FOR CLOUD COMPUTING

(71) Applicant: Accenture Global Solutions Limited, Dublin (IE)

(72) Inventors: Madhan Kumar Srinivasan, Bangalore (IN); Kishore Kumar Gajula, Telangana (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 142 days.

(21) Appl. No.: 16/901,861

(22) Filed: Jun. 15, 2020

(65) Prior Publication Data

US 2021/0342197 A1    Nov. 4, 2021

(30) Foreign Application Priority Data

May 4, 2020    (IN) .............................. 202041018931

(51) Int. Cl.
*G06F 9/50*    (2006.01)
*G06F 11/34*    (2006.01)

(52) U.S. Cl.
CPC ............ *G06F 9/5077* (2013.01); *G06F 9/505* (2013.01); *G06F 11/3442* (2013.01)

(58) Field of Classification Search
CPC ..... G06F 9/5077; G06F 9/505; G06F 11/3442
See application file for complete search history.

(56) References Cited

U.S. PATENT DOCUMENTS

| 10,191,778 | B1 | 1/2019 | Yang et al. |
| 2016/0085772 | A1* | 3/2016 | Vermeulen .............. G06F 16/21 707/615 |

(Continued)

FOREIGN PATENT DOCUMENTS

EP    3495952 A1    6/2019

OTHER PUBLICATIONS

Markus Fensterer; Supporting Capacity Planning of Cloud Computing Data Centers with Long Term Trend Analysis of Performance Monitoring Data; Jul. 16, 2012; (Year: 2012).*

(Continued)

*Primary Examiner* — Dong U Kim
(74) *Attorney, Agent, or Firm* — Crowell & Moring

(57) ABSTRACT

A system includes a multi-layer capacity configuration optimization (CCO) stack to generate a token containing prescriptions for optimize capacity configuration of a database container in a NoSQL database cloud service. The system may aggregate the capacity utilization data; predict, based on the aggregated capacity utilization data, respective prediction-based processing capacity utilizations for the database container; determine a target processing capacity utilization value from the prediction-based processing capacity utilizations; calculate respective provisioned processing capacity utilizations based on the target processing capacity utilization value; evaluate a consumption metric based on the prediction-based processing capacity utilizations and the provisioned processing capacity utilizations; select one of the predetermined capacity modes as a recommended capacity mode for the database container based on the consumption metric. The system may determine a recommended capacity throughput based on the recommended capacity mode selected and the target processing capacity utilization value.

20 Claims, 12 Drawing Sheets

(56) References Cited

U.S. PATENT DOCUMENTS

2016/0321588 A1    11/2016  Das et al.
2020/0104375 A1*   4/2020   Earnesty, Jr. ....... G06F 11/3065
2021/0073226 A1*   3/2021   Chavan ............... G06F 16/9024

OTHER PUBLICATIONS

Extended European Search Report in Europe Application No. 21169686.9, dated Sep. 9, 2021, 12 pages.

* cited by examiner

DynomoDB Capacity Advisor

| Table Type | Capacity Mode | Capacity Bandwidth | | hourly_cost (writes) | hourly_cost (read) |
|---|---|---|---|---|---|
| | | RCU | WCU | | |
| Standard | Standard | 100 | 100 | 0.065 | 0.013 |
| Standard | On-Demand | 100 | 100 | 0.45 | 0.09 |
| Standard | Autoscaling | 100 | 100 | 0.0661 | 0.0141 |
| Standard | Standard | 200 | 200 | 0.13 | 0.026 |
| Standard | On-Demand | 200 | 200 | 0.9 | 0.18 |
| Standard | Standard | 300 | 300 | 0.195 | 0.039 |
| Standard | Standard | 300 | 300 | 0.195 | 0.039 |
| Standard | Autoscaling | 100 | 100 | 0.0661 | 0.0141 |
| Standard | On-Demand | 400 | 400 | 1.8 | 0.36 |
| Standard | On-Demand | 100 | 100 | 0.45 | 0.09 |
| Standard | Reserved | 100 | 100 | 0.0128 | 0.0025 |
| Standard | Standard | 100 | 100 | 0.065 | 0.013 |
| Standard | Reserved | 300 | 300 | 0.0384 | 0.0075 |
| Standard | Reserved | 200 | 200 | 0.0256 | 0.005 |
| Standard | On-Demand | 200 | 200 | 0.9 | 0.18 |
| Standard | Standard | 400 | 400 | 0.26 | 0.052 |
| Standard | Standard | 400 | 400 | 0.26 | 0.052 |
| Standard | Standard | 100 | 100 | 0.0975 | 0.013 |

FROM Figure 5A

TO Figure 5C

Priority: *MEDIUM*

Potential Savings: $64.6 (21.0%)

Priority: *HIGH*

Potential Savings: $239.8 (78.0%)

Figure 5B

| daily_cost_writes | daily_cost_reads | effective_cost | on_demand_cost | Potential Savings |
|---|---|---|---|---|
| 1.56 | 0.312 | 1.872 | 12.96 | 11.088 |
| 10.8 | 2.16 | 12.96 | 12.96 | 0 |
| 1.5864 | 0.3384 | 1.9248 | 12.96 | 11.0352 |
| 3.12 | 0.624 | 3.744 | 25.92 | 22.176 |
| 21.6 | 4.32 | 25.92 | 25.92 | 0 |
| 4.68 | 0.936 | 5.616 | 38.88 | 33.264 |
| 4.68 | 0.936 | 5.616 | 38.88 | 33.264 |
| 1.5864 | 0.3384 | 1.9248 | 12.96 | 11.0352 |
| 43.2 | 8.64 | 51.84 | 51.84 | 0 |
| 10.8 | 2.16 | 12.96 | 12.96 | 0 |
| 0.3072 | 0.06 | 0.3672 | 12.96 | 12.5928 |
| 1.56 | 0.312 | 1.872 | 12.96 | 11.088 |
| 0.9216 | 0.18 | 1.1016 | 38.88 | 37.7784 |
| 0.6144 | 0.12 | 0.7344 | 25.92 | 25.1856 |
| 21.6 | 4.32 | 25.92 | 25.92 | 0 |
| 6.24 | 1.248 | 7.488 | 51.84 | 44.352 |
| 6.24 | 1.248 | 7.488 | 51.84 | 44.352 |
| 2.34 | 0.312 | 2.652 | 12.96 | 10.308 |

FROM Figure 5B

Figure 5C

NOSQL DATABASE CAPACITY CONFIGURATION OPTIMIZATION SYSTEM FOR CLOUD COMPUTING

RELATED APPLICATION

This application claims priority to Indian Provisional Patent Application No. 202041018931, entitled "NOSQL DATABASE CAPACITY CONFIGURATION OPTIMIZATION SYSTEM FOR CLOUD COMPUTING" filed on May 4, 2020, wherein the entirety of the above-referenced application is incorporated herein by reference.

TECHNICAL FIELD

This disclosure relates to capacity configuration optimization in NoSQL database cloud computing using a NoSQL database capacity configuration optimization system.

BACKGROUND

Rapid advances in communications and storage technologies, driven by immense customer demand, have resulted in widespread adoption of cloud systems for managing large data payloads, distributed computing, and record systems. As one example, modern enterprise systems, for example those relying on object storage architectures, presently maintain data records many petabytes in size in the cloud. Improvements in tools for cloud resource allocation, utilization, and consumption prediction will further enhance the capabilities of cloud computing systems.

SUMMARY

This disclosure relates to systems and methods for optimizing processing capacity configuration such as capacity mode and capacity throughput of a database container. Such a database container may be commissioned by a user, such as business organization, for NoSQL database cloud-based computing architectures to process the user's data.

In one embodiment, a system for optimizing the processing capacity configuration for the user of the database container in a NoSQL database is disclosed. The system may include a network interface circuitry and an optimization circuitry in data communication with the network interface circuitry. The network interface circuitry may be configured to receive utilization tracking data for a database container configured with a processing capacity configuration. The processing capacity configuration may include one of a plurality of capacity modes. Each capacity mode may represent a manner to provision processing capacity on the database container. The network interface circuitry may be configured to send a capacity configuration optimization (CCO) token to a host interface. The host interface may be configured to execute the CCO token to reconfigure the database container with a recommended capacity mode.

The optimization circuitry may be configured to execute a CCO stack. At a prescriptive engine layer of the CCO stack, the CCO stack is executable to obtain capacity utilization data from the utilization tracking data; aggregate the capacity utilization data based on a predetermined time granularity; for each of subintervals having the predetermined time granularity over a CCO interval, predict, based on the aggregated capacity utilization data, respective prediction-based processing capacity utilizations for the database container with a prediction engine; determine a target processing capacity utilization value from the prediction-based processing capacity utilizations; calculate respective provisioned processing capacity utilizations for each of the subintervals over the CCO interval based on the target processing capacity utilization value; select one of the capacity modes as the recommended capacity mode based on the prediction-based processing capacity utilizations and the provisioned processing capacity utilizations; generate the CCO token based on the recommended capacity mode; and send the CCO token to the host interface via the network interface circuitry.

In another embodiment, a method for optimizing the processing capacity configuration for the user of a database container is disclosed. The method may include, at network interface circuitry, receiving utilization tracking data for a database container configured with a processing capacity configuration. The processing capacity configuration may include one of a plurality of capacity modes. The capacity mode may represent a manner to provision processing capacity on the database container.

An optimization circuitry may be in data communication with the network interface circuitry. The method may execute a capacity configuration optimization (CCO) stack at the optimization circuitry, including, at a prescriptive engine layer of the CCO stack, obtaining capacity utilization data from the utilization tracking data; aggregating the capacity utilization data based on a predetermined time granularity; for each of a plurality of subintervals having the predetermined time granularity over a CCO interval, predicting based on the aggregated capacity utilization data, respective prediction-based processing capacity utilizations for the database container with a prediction engine; determining a target processing capacity utilization value from the prediction-based processing capacity utilizations; calculating respective provisioned processing capacity utilizations for each of the subintervals over the CCO interval based on the target processing capacity utilization value; evaluating a consumption metric of the database container based on the prediction-based processing capacity utilizations and the provisioned processing capacity utilizations; selecting one of the plurality of capacity modes as a recommended capacity mode based on the consumption metric; generating, at the prescriptive engine layer, a CCO token based on the recommended capacity mode; and sending, via the network interface circuitry, the CCO token to a host interface configured to execute the CCO token to reconfigure the database container with the recommended capacity mode.

In another embodiment, a product for optimizing the processing capacity configuration for a user of a database container is disclosed. The product may include machine-readable media other than a transitory signal and instructions stored on the machine-readable media. The instructions may be configured to, when executed, cause a machine to, at network interface circuitry, receive utilization tracking data for a database container configured with a processing capacity configuration. The processing capacity configuration may include one of a plurality of capacity modes. The capacity mode may represent a different scaling of processing capacity on the database container.

An optimization circuitry may be in data communication with the network interface circuitry. At the optimization circuitry executing a capacity configuration optimization (CCO) stack, the instructions may be configured to, when executed, cause a machine to, at a prescriptive engine layer of the CCO stack, obtain capacity utilization data from the utilization tracking data; aggregate the capacity utilization data based on a predetermined time granularity; for each of a plurality of subintervals having the predetermined time granularity over a CCO interval, predict based on the aggregated capacity utilization data, respective prediction-based processing capacity utilizations for the database container with a prediction engine; determine a target processing capacity utilization value from the prediction-based processing capacity utilizations; calculate respective provisioned processing capacity utilizations for each of the subintervals over the CCO interval based on the target processing capacity utilization value; select one of the capacity modes as a recommended capacity mode based on the prediction-based processing capacity utilizations and the provisioned processing capacity utilizations; generate, at the prescriptive engine layer, a CCO token based on the recommended capacity mode; and send, via the network interface circuitry, the CCO token to a host interface configured to execute the CCO token to reconfigure the database container with the recommended capacity mode.

One interesting feature of the NoSQL database capacity configuration optimization system and method described below may be that it may select a proper capacity mode for the NoSQL database container such as a database table in its next operation time interval. The capacity mode may include an on-demand mode, a standard mode, an auto-scaling mode, and a reserved mode. For example, for the database table whose workloads are less predictable, the system may intend to select the on-demand mode. The standard mode may be desirable where the system determines that the database table has an expected utilization of provisioned processing capacity (or capacity). If the system determines that the database table has very predictable workloads for a longer period of time, e.g. one year, the reserved mode may be more proper. To select the proper capacity mode, for each subintervals within next operation time interval, the system may predict respective processing capacity utilizations of the database table with a deep-learning prediction engine. The predicted processing capacity utilizations may form a predicted utilization curve. Then, the system may evaluate the consumption metrics of the database table under respective capacity modes based on the predicted processing capacity utilizations.

Alternatively or additionally, another interesting feature of the system and method described below may be that it may present deeper insights into the distribution of the predicted processing capacity utilizations on the predicted utilization curve as opposed to, for example, simply taking the average of the predicted processing capacity utilizations. For example, in evaluating the consumption metrics, the system may leverage percentile calculation instead of average calculation. In this way, the evaluated consumption metric may be closer to the actual consumption metric.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

FIGS. 5A-5C show an example processing capacity configuration optimization control interface.

DETAILED DESCRIPTION

A NoSQL database may provide cloud computing services to a user such as a business organization, including data storage service and data processing service. The NoSQL database may handle larger volumes of rapidly changing unstructured data, for example, data generated from the cloud, mobile, social media and big data, than a relational (SQL) database with rows and tables. A database container for a NoSQL database may be a data storage and processing unit of the NoSQL database. The NoSQL database may include multiple database containers. The database containers of a NoSQL database may include, for example, a table.

Figure 1:
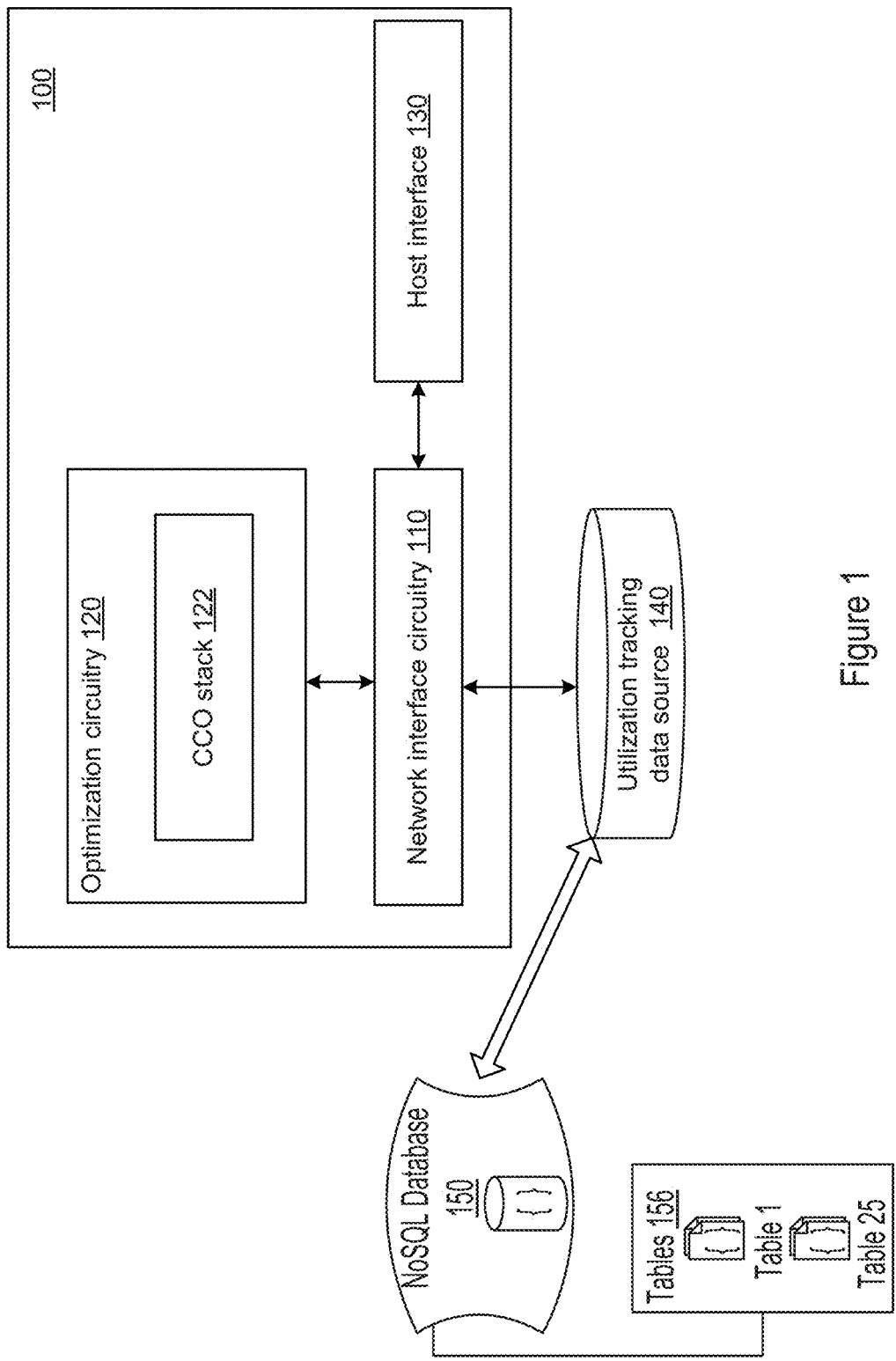
FIG. 1 shows an example system for optimizing the processing capacity configuration of the database container in accordance with an embodiment.

FIG. 1 illustrates an example NoSQL database capacity configuration optimization system 100 for database container capacity configuration optimization in a NoSQL database. The system 100 may include a network interface circuitry 110, an optimization circuitry 120, and a host interface 130. The network interface circuitry 110 may communicate with the optimization circuitry 120 and the host interface 130. The utilization tracking data source 140 may store the utilization tracking data of a NoSQL database such as the NoSQL database 150. The utilization tracking data may include, for example, historical capacity utilization data and storage utilization data of individual database containers. The NoSQL database may include one or more database containers.

A database container (or container) may include, for example, a table. In an example, the NoSQL database 150 may include twenty-five tables 156 as illustrated in FIG. 1. The network interface circuitry 110 may communicate with the utilization tracking data source 140 to receive utilization tracking data of, for example the tables 156 in the NoSQL database 150. The optimization circuitry 120 may execute the capacity configuration optimization (CCO) stack 122 to perform prescriptive analysis on the utilization tracking data of the database container to obtain a recommended processing capacity configuration. The functions of the CCO stack 122 will be described in detail later with reference to FIG. 2. During execution of the CCO stack 122, the optimization circuitry 120 may generate a CCO token which may, for example, include a logic reconfigure the database container with the recommended processing capacity configuration. The network interface circuitry 110 may send the CCO token to the host interface 130. The host interface 130 may, for example, include an Application Programming Interface (API) for reconfigure the processing capacity configuration for the database container and execute the CCO token with the API to accomplish the reconfiguration.

Herein, the processing capacity configuration (or capacity configuration) may include a capacity mode and a capacity throughput. The capacity mode may represent a manner to provision processing capacity on the database container. The capacity throughput may represent processing capacity provisioned on the database container to process data per unit time. Data processing operations by the database container may include, for example, read operations and write operations.

The capacity modes may include an on-demand mode, a standard mode, a reserved mode, and an auto-scaling mode. In the on-demand mode, the database may dynamically provide the database container with the capacity throughput based on the workloads of the database container. That said, the capacity throughput for the database container may increase/decrease with the workloads of the database container. In the standard mode, the database may provide the database container with a specified capacity throughput. In the reserved mode, the database may reserve a specified capacity throughput for the database container over at least a predetermined period of time. In the auto-scaling mode, the database may provide the database container with a specified capacity throughput and automatically increase/decrease the capacity throughput when some predetermined conditions are satisfied, for example, the consumption of the capacity throughput exceeds a consumption threshold.

AMAZON DynamoDB® is a NoSQL database. Taking the DynamoDB as an example, the capacity throughput may include, for example, read capacity unit (RCU) and write capacity unit (WCU). In the DynamoDB, one read capacity unit may represent one read per second for a data item up to 4 KiloBytes (KB) in size. If the user needs to read a data item that is larger than 4 KB, the DynamoDB container may consume additional RCUs. The total number of RCUs required depends on the data item size. One write capacity unit may represent one write per second for a data item up to 1 KB in size. If the user needs to write a data item that is larger than 1 KB, the DynamoDB container must consume additional write capacity units. The total number of WCUs required depends on the data item size. Optionally, the capacity throughput may further include, for example, replicated write capacity unit, stream read request unit, and transactional read/write request unit. The replicated write capacity unit may represent the capacity provisioned on the database container to process write requests to multiple copies of the database container distributed in different physical locations, such as on different servers in different geographic regions. The stream read request unit may represent the capacity provisioned on the database container to process stream read requests. The transactional read/write request unit may represent the capacity provisioned on the database container to process transactional read/write requests. The transactional read/write requests differentiate from the standard read/write requests because all operations contained in a single transaction need to succeed or fail as an atomic operation.

In an example, when a user first activates DynamoDB data storage and processing services, DynamoDB may be configured for a capacity mode and capacity throughput for a DynamoDB container used by the user. In the beginning, the workloads of the DynamoDB container may not be predictable, and thus the capacity mode of the DynamoDB container may be set to the on-demand mode, under which the DynamoDB may provide the DynamoDB container with dynamic capacity throughput based on the actual workloads of the DynamoDB container. Over time, the workloads of the DynamoDB container may be predictable, for example, based on the historical capacity utilization data of the user. In this case, it may be desirable for the user to switch the capacity mode from the on-demand mode to another mode such as the standard mode or the reserved mode because the unit cost of the capacity throughput is different under various capacity modes. For example, the unit cost of the capacity throughputs, such as RCUs and WCUs, under the on-demand mode may be higher than the standard mode, and the unit cost of the capacity throughputs under the standard mode may be higher than the reserved mode. Where the DynamoDB container is switched from the on-demand mode to the standard mode, the DynamoDB may provision the user's DynamoDB container with the same processing capacity, i.e. the same capacity throughput, with less cost.

The NoSQL database capacity configuration optimization system 100 described herein enables users to optimize the capacity mode, for example, by predicting the capacity throughputs to be consumed by the user based on the historical capacity utilization data of the user and select the proper capacity mode based on the prediction. In this way, the system 100 may reduce the user's maintenance cost of the DynamoDB container without compromising the performance of data storage and processing services provided by the DynamoDB.

Referring to FIG. 1, the system 100 may perform prescriptive analysis on database containers in the NoSQL database 150, to optimize the capacity configurations of the database containers. In other examples, the system 100 may perform the prescriptive analysis on database containers within one or more NoSQL databases. The database containers may be located in the same or different databases, servers, and/or geographical regions.

Figure 2:
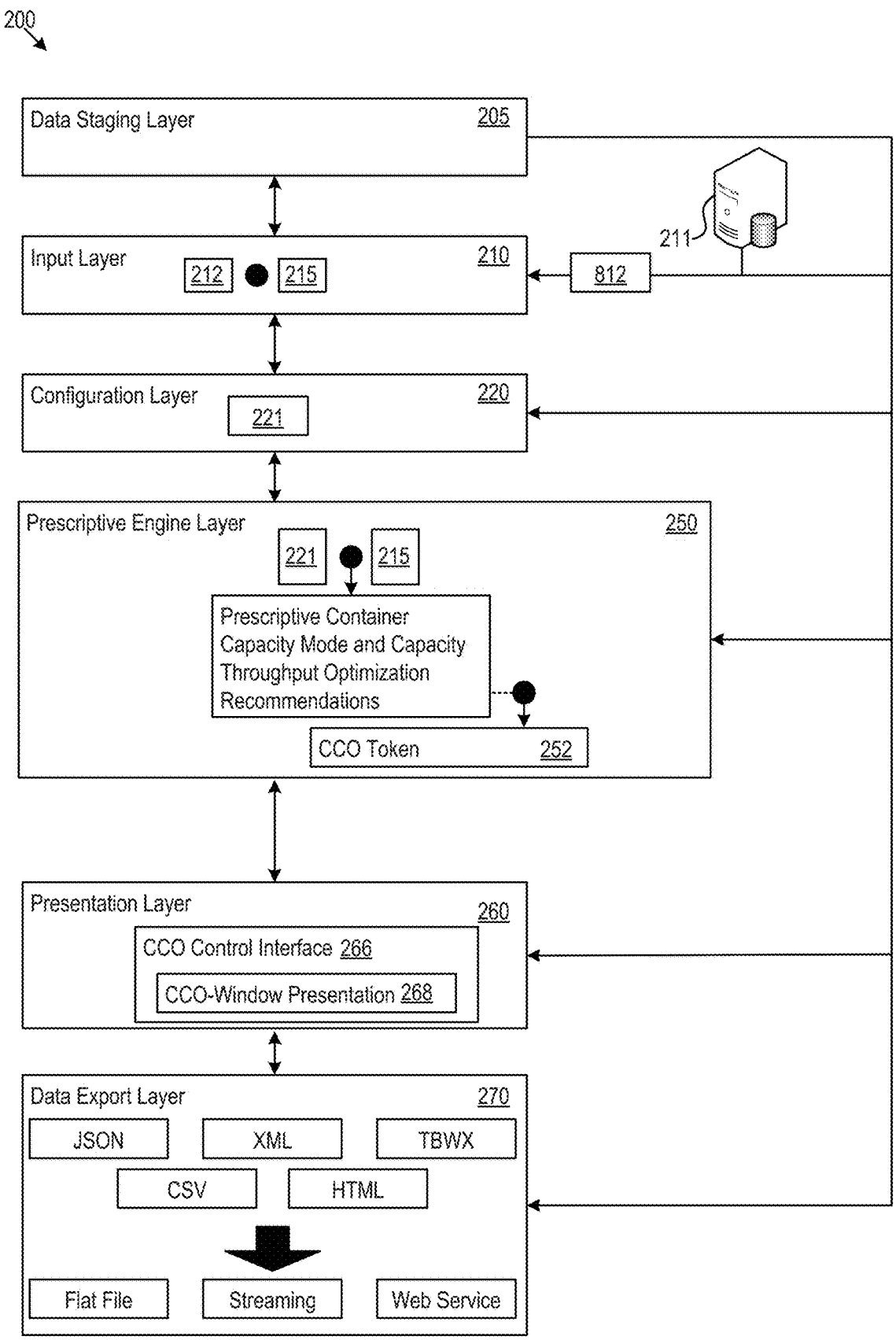
FIG. 2 shows an example multiple-layer processing capacity configuration optimization stack included in a system.

FIG. 2 shows an example multiple layer CCO stack 200. The NoSQL database capacity configuration optimization system described herein may use the CCO stack 200 to prescribe recommendations for database container capacity configuration optimization based on analysis of data associated with the database container. The capacity configuration optimization analysis performed by the system may include, for example, updating the capacity mode of the database container and rightsizing the provisioned capacity throughput on the database container. Further, the system may include in the analysis utilization tracking data and consumption metrics data of the database container. The consumption metrics data may, for example, include data of cost metrics of the database container. The utilization tracking data may include, for example, the capacity utilization data of individual database containers. The capacity utilization data may include, for example, consumed read capacity units, consumed write capacity units, consumed replicated write capacity units and consumed transactional requests.

In this example, the CCO stack 200 may include a data staging layer 205, an input layer 210, a configuration layer 220, a prescriptive engine layer 250, a presentation layer 260, and a data export layer 270. The CCO stack 200 may include a multiple-layer computing structure of hardware and software that may provide prescriptive analytical recommendations (e.g., capacity configuration optimization prescriptions) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the CCO stack 200, the data staging layer 205 may provide the input layer 210 with storage resources to store ingested data within a database or other data structure. In some implementations, the data staging layer 205 may be deployed as a cloud-based database platform with the capability to process mass data. In an example, an underlying Big Data Lake of the database platform is capable of ingesting data from heterogeneous data sources such as Secured Storage, Hadoop file systems (HDFS) connections, relational databases, flat files, and other data operations. Hence, the data staging layer 205 may provide a hardware resource, e.g., memory resources, to the input layer 210. Accordingly, the multiple-layer stack architecture of the CCO stack 200 may improve the functioning of the underlying hardware.

Figure 3:
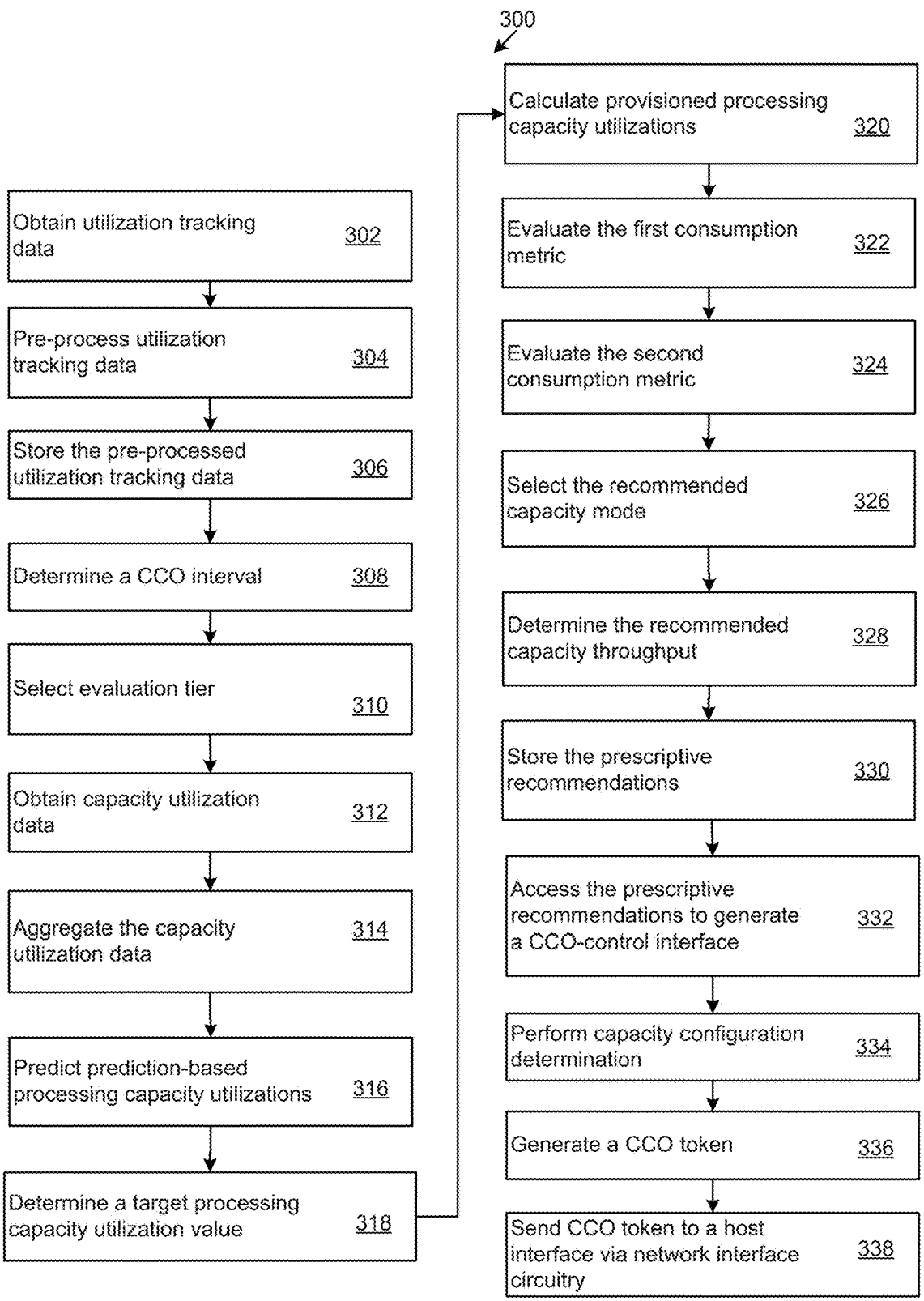
FIG. 3 shows example processing capacity configuration optimization logic.

In the following, reference is made to FIG. 2 and the corresponding example CCO logic (CCOL) 300 in FIG. 3. The logical features of CCOL 300 may be implemented in various orders and combinations. For example, in a first implementation, one or more features may be omitted or reordered with respect to a second implementation. At the input layer 210 of the CCO stack 200, the CCOL 300 may obtain utilization tracking data 212 of the database container as the input data (302). In some cases, the utilization tracking data 212 may be received via the network interface circuitry (e.g., the network interface circuitry 812, discussed below). The utilization tracking data 212 may be accessed at least in part, e.g., via the network interface circuitry 812, from data sources 211, which may include, database container utilization files, database container expenditure files, or other data sources.

Optionally, at the input layer 210, the CCOL 300 may pre-process the utilization tracking data 212 (304). In some implementations, the pre-processing may include data transformations on the utilization tracking data 212 such as z transformation, log transformation and data minimization. Alternatively or additionally, the pre-processing may treat missing value data in the utilization tracking data 212. For example, the missing value data is treated to map NULL to 0. Alternatively or additionally, the pre-processing may converting measurement units such as date time conversion, currency conversions, numerical conversions, and other data type conversions.

The CCOL 300 then may, at the input layer 210, store the pre-processed utilization tracking data 215 via a memory operation at the data staging layer 205 (306). In some implementations, the pre-processed utilization tracking data 215 may be indexed to speed up query processing.

At the configuration layer 220, the CCOL 300 may determine a CCO interval 221 to optimize capacity configuration of the database container (308). For example, the CCO interval 221 may be predetermined to be periodical or non-periodical (e.g., hourly, six hours, daily, weekly, monthdate, and yearly). Alternatively or in addition, in another example, the CCO interval 221 may be selected by the system operator.

Figure 4:
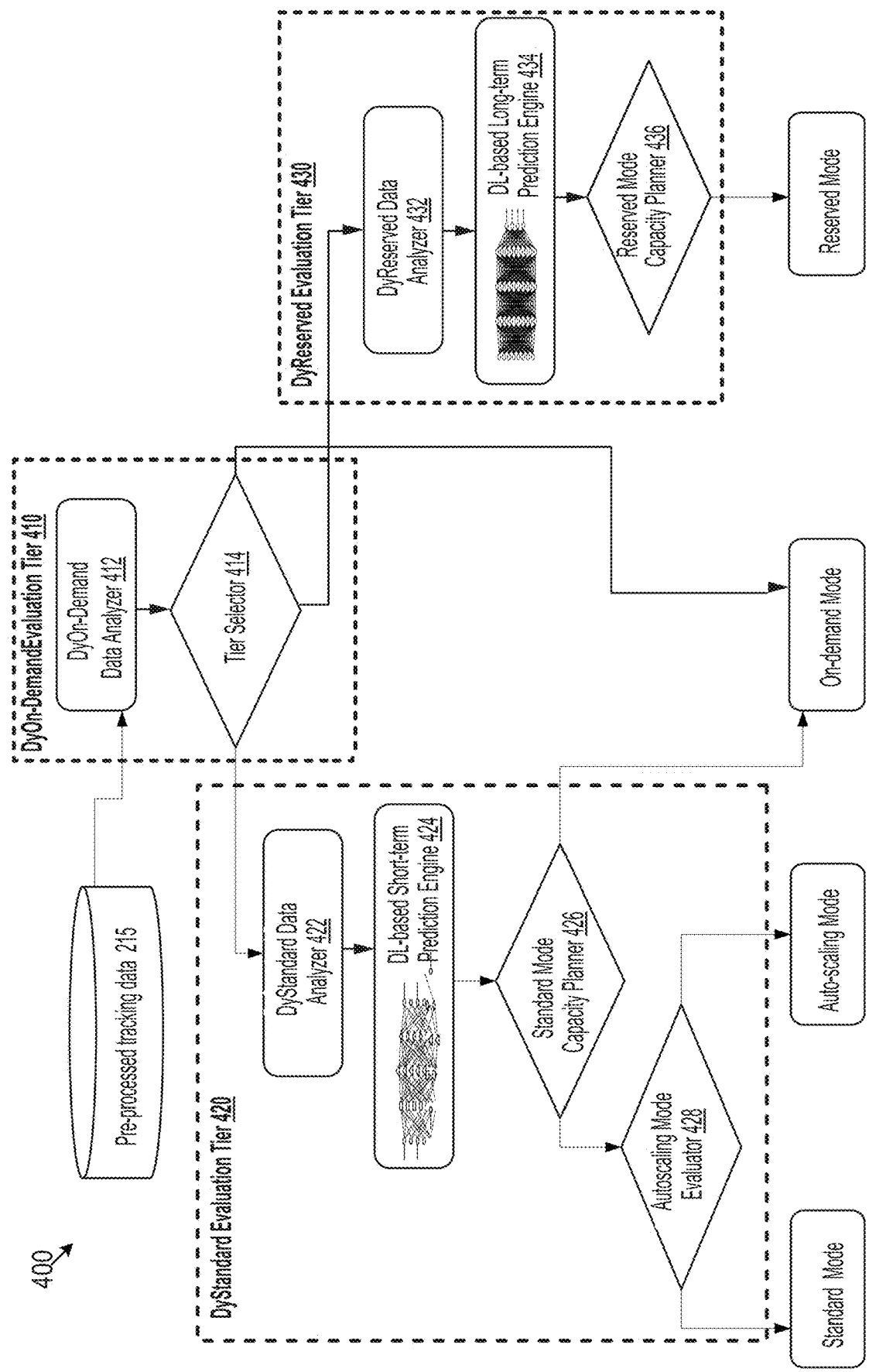
FIG. 4 shows an example system execution implementation for a prescriptive engine layer of the processing capacity configuration optimization stack in accordance with an embodiment.

At the prescriptive engine layer 250, the CCOL 300 may analyze the database container to generate capacity configuration optimization recommendations. FIG. 4 is a block diagram example of a NoSQL database capacity configuration optimization system 400 illustrating execution implementation for the prescriptive engine layer 250 of the CCO stack 200. Example operation of the CCOL 300 at the prescriptive engine layer 250 will be described with reference to the system 400 of FIG. 4.

The execution of the system 400 may include a DyOn-Demand evaluation Tier 410, a DyStandard evaluation tier 420, and a DyReserved Evaluation Tier 430. The DyOn-Demand evaluation Tier 410 may include a DyOn-Demand data analyzer 412 and a tier selector 414. The DyStandard evaluation tier 420 may include a DyStandard data analyzer 422, a prediction engine 424, a standard mode capacity planner 426, and an auto-scaling mode evaluator 428. The DyReserved evaluation tier 430 may include a DyReserved data analyze 432, a prediction engine 434, and a reserved mode capacity planner 436.

At the DyOn-Demand data analyzer 412, the CCOL 300 may obtain a utilization time length and a utilization data missing coefficient for the database container via the data-staging layer 205. The utilization time length may be represented by, for example, days and the utilization data missing coefficient may represent the percentage of days for which the utilization data is missing over the utilization time length. Where the utilization time length of the database container is less than a first utilization time threshold, e.g., 30 days, the CCOL 300 may directly determine that the recommended capacity mode for the database container is the on-demand mode. Accordingly, the recommended capacity throughput, e.g. read capacity unit and write capacity unit, may be set to zero.

At the tier selector 414, where the utilization time length of the database container is longer than the first utilization time threshold, e.g., 30 days and the utilization data missing coefficient is less than 10%, the CCOL 300 may select to proceed to the DyStandard evaluation tier 420 or the DyReserved Evaluation Tier 430 based on the utilization time length. As an example, where the utilization time length is greater than a second utilization time length threshold, e.g., one or two years, the CCOL 300 may select to proceed to the DyReserved Evaluation Tier 430. Where the utilization time length is greater than the first utilization time threshold but less than the second utilization time threshold, the CCOL 300 may select to proceed to DyStandard evaluation tier 420.

Where the CCOL 300 proceeds to the DyReserved Evaluation Tier 430, the CCOL 300 may, for example, select one of the reserved mode and the on-demand mode as the recommended capacity mode of the database container based on the prescriptive analysis as described as follows. At the DyReserved Data Analyzer 432, the CCOL 300 may obtain capacity utilization data of the database container for each unit time from the pre-processed utilization tracking data 215 via the data-staging layer 205 (312). The unit time may be, for example, second, minute, and hour. Then, the CCOL 300 may aggregate the capacity utilization data based on a predetermined time granularity (314). At the DyReserved Evaluation Tier 430, the time granularity may be predetermined to be, for example, daily. As such, the capacity utilization data may be aggregated from, for example, minute-level granularity to day-level granularity.

At the prediction engine 434, for each of subintervals with the day-level granularity over the CCO interval, e.g., for each day over the next 365 days, the CCOL 300 may predict, based on the aggregated capacity utilization data, respective prediction-based processing capacity utilizations for the database container with the prediction engine 434 (316). As the utilization time length of the database container is greater than the second utilization time length threshold, e.g., one or two years, the CCOL 300 may determine the prediction engine 434 as a long-term deep learning model. The long-term deep learning model may be trained to predict the prediction-based processing capacity utilizations for the database container based on the historical capacity utilization data with such longer utilization time length. The respective prediction-based processing capacity utilizations may be stored in, for example, a vector data structure.

At the reserved mode capacity planner 436, the CCOL 300 may determine a target processing capacity utilization value from the prediction-based processing capacity utilizations (318). In an implementation, the target processing capacity utilization value is greater than processing capacity utilization values of a predetermined portion of the prediction-based processing capacity utilizations. For example, the CCOL 300 may determine the target processing capacity utilization value as a Nth percentile processing capacity utilization value of the prediction-based processing capacity utilizations and calculate the Nth processing capacity utilization value. In some implementations, the Nth percentile is greater than or equal to 95th percentile. Here, the percentile value of the prediction-based processing capacity utilizations may present deeper insights into the distribution of the predicted utilization curve of the database container as opposed to the average value of the prediction-based processing capacity utilizations.

For example, in the prediction-based processing capacity utilizations of the database container, 95% of the predicted capacity utilizations are 10 RUs while 5% of the predicted capacity utilizations are 100 RUs. As such, the 95th percentile predicted capacity utilization value is 10 RUs while the averaged predicted capacity utilization value 14.5 RUs. Thus, the 95th percentile predicted capacity utilization value is more closely reflect the processing capacity to be utilized over the CCO interval.

Then, the CCOL 300 may calculate respective provisioned processing capacity utilizations for each of the subintervals within the CCO interval based on the target processing capacity utilization value (320). For example, the CCOL 300 may calculate each of the respective provisioned processing capacity utilizations as being equal to the target processing capacity utilization value. For another example, the CCOL 300 may add a predetermined yearly processing capacity utilization buffer to the target processing capacity utilization value to obtain a buffered processing capacity utilization value. The predetermined yearly processing capacity utilization buffer may be buffer value for annual prediction. Then, the CCOL 300 may calculate each of the respective provisioned processing capacity utilizations as being equal to the buffered processing capacity utilization value. The respective provisioned processing capacity utilizations may be stored in, for example, a vector data structure.

Subsequently, the CCOL 300 may select one of the first capacity mode or the second capacity mode as the recommended capacity mode based on the prediction-based processing capacity utilizations and the provisioned processing capacity utilizations. For example, the CCOL 300 may evaluate the consumption metrics of the database container under different capacity modes based on the respective prediction-based processing capacity utilizations and the respective provisioned processing capacity utilizations and select the recommended capacity mode based on the evaluated consumption metrics.

In an implementation, the CCOL 300 may evaluate a first consumption metric of the database container under a first capacity mode based on the respective prediction-based processing capacity utilizations and the respective provisioned processing capacity utilizations (322). At the DyReserved evaluation tier 430, as the utilization time length of the database container is greater than the second utilization time length threshold, e.g. a predetermined number of years, the first capacity mode is set to the reserved mode. In an implementation, the CCOL 300 may calculate respective provisioned unutilized processing capacity values for each of the subintervals over the CCO interval as the respective provisioned processing capacity utilizations minus the respective prediction-based processing capacity utilizations. Then, the CCOL 300 may sum up the respective provisioned unutilized processing capacity values to get a total provisioned unutilized processing capacity value. The CCOL 300 may sum up values of the respective prediction-based processing capacity utilizations to get a total provisioned utilized processing capacity value. Subsequently, the CCOL 300 may calculate the first consumption metric of the database container, for example, by multiplying the sum of the total provisioned unutilized processing capacity value and the total provisioned utilized processing capacity value by the capacity unit cost under the reserved mode.

Then, the CCOL 300 may evaluate a second consumption metric of the database container under a second capacity mode based on the respective prediction-based processing capacity utilizations (324). In an implementation, the second capacity mode is the on-demand mode by default. For example, the CCOL 300 may sum up values of the respective prediction-based processing capacity utilizations to get the total provisioned utilized processing capacity value, and then calculate the second consumption metric of the database container by multiplying the total provisioned utilized processing capacity value by the capacity unit cost under the on-demand mode.

Continuing at the reserved mode capacity planner 436, the CCOL 300 may select one of the first capacity mode, i.e., the reserved mode, and the second capacity mode, i.e. the on-demand mode, as the recommended capacity mode based on the first consumption metric and the second consumption metric (326). In an implementation, if the difference value of the second consumption metric minus the first consumption metric is greater than a predetermined difference threshold, e.g., 50-100, the CCOL 300 may select the reserved mode as the recommended capacity mode. Otherwise, the CCOL 300 may select the on-demand mode as the recommended capacity mode.

Subsequently, the CCOL 300 may determine a recommended capacity throughput for the database container based on the recommended capacity mode (328). For example, where the recommended capacity mode is the reserved mode, the CCOL 300 may determine the recommended capacity throughput to be the target processing capacity utilization value plus a predetermined yearly processing capacity utilization buffer. Where the recommended capacity mode is the on-demand mode, the CCOL 300 may determine the recommended capacity throughput to be zero because the database container does not need to be provisioned with any capacity throughput in on-demand mode.

Where the CCOL 300 proceeds to the DyStandard evaluation tier 420, the CCOL 300 may, for example, select one of the standard mode and the on-demand mode as the recommended capacity mode of the database container based on the prescriptive analysis as described as follows. Similar to the DyReserved data analyzer 432, at the DyStandard data analyzer 422, the CCOL 300 may obtain capacity utilization data of the database container for each unit time from the pre-processed utilization tracking data 215 via the data-staging layer 205 (312). The unit time may be, for example, second, minute, and hour. Then, the CCOL 300 may aggregate the capacity utilization data based on a predetermined time granularity (314). At the DyStandard evaluation tier 420, the time granularity may be predetermined to be, for example, hourly. As such, the capacity utilization data may be aggregated from, for example, minute-level granularity to hour-level granularity.

At the prediction engine 424, for each of subintervals with the hour-level granularity over the CCO interval, e.g., for each hour over the next 24 hours, the CCOL 300 may predict, based on the aggregated capacity utilization data, respective prediction-based processing capacity utilizations for the database container with the prediction engine 424 (316). As the utilization time length of the database container is less than or equal to the second utilization time length threshold, e.g., a predetermined number of years, the CCOL 300 may determine the prediction engine 424 as a short-term deep learning model. The short-term deep learning model may be trained to predict the respective prediction-based processing capacity utilizations for the database container based on the historical capacity utilization data with such shorter utilization time length. The respective prediction-based processing capacity utilizations may be stored in, for example, a vector data structure.

At the standard mode capacity planner 426, the CCOL 300 may determine a target processing capacity utilization value from the prediction-based processing capacity utilizations predicted at the prediction engine 424 (318). In an implementation, the target processing capacity utilization value is greater than processing capacity utilization values of a predetermined portion of the prediction-based processing capacity utilizations. For example, the CCOL 300 may determine the target processing capacity utilization value as a Nth percentile processing capacity utilization value of the prediction-based processing capacity utilizations and calculate the Nth processing capacity utilization value. In some implementations, the Nth percentile is greater than or equal to 95th percentile.

Then, the CCOL 300 may calculate respective provisioned processing capacity utilizations for each of the subintervals over the CCO interval based on the target processing capacity utilization value (320). For example, the CCOL 300 may calculate each of the respective provisioned processing capacity utilizations as being equal to the target processing capacity utilization value. For another example, the CCOL 300 may add a predetermined daily processing capacity utilization buffer to the target processing capacity utilization value to obtain a buffered processing capacity utilization value. The predetermined daily processing capacity utilization buffer may be buffer value for per day prediction, which may be less than the buffer value for annual prediction used at the reserved mode capacity planner 436. Then, the CCOL 300 may calculate each of the respective provisioned processing capacity utilizations as being equal to the buffered processing capacity utilization value. The respective provisioned processing capacity utilizations may be stored in, for example, a vector data structure.

Subsequently, the CCOL 300 may evaluate a first consumption metric of the database container under a first capacity mode based on the respective prediction-based processing capacity utilizations and the respective provisioned processing capacity utilizations (322). At the DyStandard evaluation tier 420, as the utilization time length of the database container is less than or equal to the second utilization time length threshold, e.g. a predetermined number of years, the first capacity mode is set to the standard mode. In an implementation, the CCOL 300 may calculate respective provisioned unutilized processing capacity values for each of the subintervals over the CCO interval, e.g., each hour over the next 24 hours, as the respective provisioned processing capacity utilizations minus the respective prediction-based processing capacity utilizations. Then, the CCOL 300 may sum up the respective provisioned unutilized processing capacity values to get a total provisioned unutilized processing capacity value. The CCOL 300 may sum up values of the respective prediction-based processing capacity utilizations to get a total provisioned utilized processing capacity value. Subsequently, the CCOL 300 may calculate the first consumption metric of the database container, for example, by multiplying the sum of the total provisioned unutilized processing capacity value and the total provisioned utilized processing capacity value by the capacity unit cost under the standard mode.

Then, the CCOL 300 may evaluate a second consumption metric of the database container under a second capacity mode based on the respective prediction-based processing capacity utilizations (324). In an implementation, the second capacity mode is the on-demand mode by default. For example, the CCOL 300 may sum up values of the respective prediction-based processing capacity utilizations to get the total provisioned utilized processing capacity value, and then calculate the second consumption metric of the database container by multiplying the total provisioned utilized processing capacity value by the capacity unit cost under the on-demand mode.

Continuing at the standard mode capacity planner 426, the CCOL 300 may select one of the first capacity mode, i.e., the standard mode, and the second capacity mode, i.e. the on-demand mode, as the recommended capacity mode based on the first consumption metric and the second consumption metric (326). In an implementation, if the difference value of the second consumption metric minus the first consumption metric is greater than a predetermined difference threshold, e.g., 5-10, the CCOL 300 may select the standard mode as the recommended capacity mode. Otherwise, the CCOL 300 may select the on-demand mode as the recommended capacity mode.

Subsequently, the CCOL 300 may determine a recommended capacity throughput for the database container based on the recommended capacity mode (328). For example, where the recommended capacity mode is the reserved mode, the CCOL 300 may determine the recommended capacity throughput to be the target processing capacity utilization value plus a predetermined daily processing capacity utilization buffer. Where the recommended capacity mode is the on-demand mode, the CCOL 300 may determine the recommended capacity throughput to be zero because the database container does not need to be provisioned with any capacity throughput in on-demand mode.

Optionally, where the standard mode is selected as the recommended capacity mode, the CCOL 300 may evaluate whether to update the recommended capacity mode to the auto-scaling mode at the auto-scaling mode evaluator 428. In an implementation, the CCOL 300 may calculate a consumption ratio based on the recommended capacity throughput determined at standard mode capacity planner 426 and an alarm consumption metric. Where the consumption ratio is greater than or equal to a cutoff ratio, the CCOL 300 may update the recommended capacity mode to the auto-scaling mode. As an example, the CCOL 300 may calculate the consumption metric for consuming recommended capacity throughput by multiplying the recommended capacity throughput by the capacity unit cost under the standard mode. Then the CCOL 300 may calculate the ratio of the consumption metric to the alarm consumption metric. The alarm consumption metric may be preconfigured, for example, by the system operator at the configuration layer 220. If the ratio is greater than or equal to a predetermined cutoff ratio such as 100:1, the CCOL 300 may select the auto-scaling mode as the recommended capacity mode. Otherwise, the recommended capacity mode is still the standard mode.

Optionally, the CCOL 300 may generate a consumption optimization preview for the database container based on the recommended capacity mode and the recommended capacity throughput. The consumption optimization preview may indicate potential cost savings because of optimization recommendations of the capacity mode and the capacity throughput. For example, where the recommended capacity mode is the reserved mode, the CCOL 300 may calculate a reserved consumption metric by multiplying the recommended capacity throughput by the capacity unit cost in the reserved mode and calculate an on-demand consumption metric by multiplying the recommended capacity throughput by the capacity unit cost in the on-demand mode. Then, the CCOL 300 may calculate the potential cost savings as the on-demand consumption metric minus the reserved consumption metric.

For another example, where the recommended capacity mode is the standard mode, the CCOL 300 may calculate a standard consumption metric by multiplying the recommended capacity throughput by the capacity unit cost in the standard mode and calculate an on-demand consumption metric by multiplying the recommended capacity throughput by the capacity unit cost in the on-demand mode. Then, the CCOL 300 may calculate the potential cost savings as the on-demand consumption metric minus the standard consumption metric.

Generally, the more the potential savings are, the higher priority that the database container should be optimized. For example, for the database containers undergoing the capacity configuration optimization analysis, the CCOL 300 may sort their potential savings in descending order and calculate cumulative saving percentages incrementally for each of the database containers in the descending order.

As an example, if the cumulative savings percentage for a database container is less than or equal to 65%, the optimization priority for the database container is set to be high. If the cumulative savings percentage for a database container is less than or equal to 85% but greater than 65%, the optimization priority for the database container is set to be medium. If the cumulative savings percentage for a database container is greater than 85%, the optimization priority for the database container is set to be low.

For purpose of illustration, the CCOL 300 may execute the example routines in Table 1 to implement functions of the prescriptive engine layer 250 in individual modules of the execution environment 400.

TABLE 1

Example Routine for prescribing capacity configuration optimization

| | Description |
|---|---|
| Example Routine | # Tier selection logic<br>Logic tier selected =<br>   if (historical_data > required_data_reserved) then run (DyReserved Evaluation Tier)<br>   else if (historical_data > required_data_standard) then run (DyStandard Evaluation Tier)<br>   else run (DyOn-Demand Evaluation Tier)<br># DyOn-Demand Evaluation Tier Logic<br>Capacity mode selected (initial monitoring period) = 'On-Demand'<br>Capacity bandwidth (initial monitoring period) = 0 units<br>where,<br>historical_data = size of available data period<br>required_data_standard= initial monitoring period of a database table to qualify DyStandard Evaluation Tier logic, e.g., 30 days<br>required_data_reserved = initial monitoring period of a database table to qualify DyReserved Evaluation Tier logic, e.g., 1-2 years<br># DyReserved Evaluation Tier Logic<br>\|predicted_series_yearly> = DL_prediction_func(\|historical_series_yearly>)<br>aggregated_yearly = aggr_func(\|predicted_series_yearly>)<br>capacity_provisioned_yearly = aggregated_yearly + β_yearly<br>\|provisioned_series_yearly> = \|1...N> * capacity_provisioned_yearly<br>\|provisioned_unutilized_yearly> = \|provisioned_series_yearly> − \|predicted_series_yearly><br>total_provisioned_unutilized_yearly = sum_func(\|provisioned_unutilized_yearly>)<br>total_provisioned_utilized_yearly = sum_func(\|predicted_series_yearly>)<br>R_cost_yearly = (total_provisioned_utilized_yearly * γ + total_provisioned_unutilized_yearly * γ)<br>OD_cost_yearly = total_provisioned_utilized_yearly * δ<br>capacity mode selected (yearly) <= if (OD_cost_yearly > R_cost_yearly + $yearly) then "Reserved" else "On-demand"<br>capacity bandwidth (yearly) <= if (OD_cost_yearly > R_cost_yearly + $yearly) then capacity_provisioned_yearly else 0<br>where,<br>\|historical_series_yearly> = historical utilization data for a period H, e.g., 365 days<br>\|predicted_series_yearly> = predicted data for a period F, per year<br>aggregated_yearly = aggregated value/estimate from predicted temporal data, e.g., $99^{th}$ or $95^{th}$ percentile<br>β_yearly = buffer value for annual prediction<br>capacity_provisioned_yearly = yearly provisioned value, sum of aggregate and buffer<br>\|1...N> = one's vector with length equals to \|predicted_series_yearly>, N indicates the dimension<br>\|provisioned_series_yearly> = product of one's vector and yearly provisioned value<br>\|provisioned_unutilized_yearly> = the vector having list of unutilized capacity values for each period, with reference to provisioned capacity for entire prediction window F |

TABLE 1-continued

Example Routine for prescribing capacity configuration optimization

Description total_provisioned_utilized_yearly = total sum of utilized quantity for the entire prediction window F
total_provisioned_unutilized_yearly = total sum of unutilized quantity for the entire prediction window F
y = reserved capacity price
δ = on-demand capacity price
R_cost_yearly = total costs incurred for reserved capacity for entire period F
O_cost_yearly = total costs incurred for on-demand capacity for entire period F
$yearly = savings threshold, e.g., 50-100$
aggr_func, sum_func, DL_prediction_func = aggregate, sum and deep learning-based prediction function respectively
Note:
- The historical data H may be 1-2 years or more
- The prediction window F usually may span across a year
- Variables represented in the formula above in the form of "| >" are vector data types

DyStandard Evaluation Tier Logic
|predicted_series_daily> = DL_prediction_func(|historical_series_daily>)
aggregated_daily = aggr_func(|predicted_series_daily>)
capacity_provisioned_daily = aggregated_daily + β_daily
|provisioned_series_daily> = |1...M> * capacity_provisioned_daily
|provisioned_unutilized_daily> = [provisioned_series_daily> − |predicted_series_daily>
total_provisioned_unutilized_daily = sum_func(|provisioned_unutilized_daily>)
total_provisioned_utilized_daily = sum_func(|predicted_series_daily>)
S_cost_daily = (total_provisioned_utilized_daily * ε + total_provisioned_unutilized_daily * ε)
OD_cost_daily = total_provisioned_utilized_daily * δ
capacity mode selected (daily) <= if (OD_cost_daily > S_cost_daily + $daily) then "Standard" else "On-demand"
capacity bandwidth (daily) <= if (OD_cost_daily > S_cost_daily + $daily) then capacity_provisioned_daily else 0
where,
|historical_series_daily> = historical utilization data for a period h, e.g. 24 hours
|predicted_series_daily> = predicted data for a period f, per day
aggregated_daily = aggregated value/estimate from predicted temporal data, e.g., $99^{th}$ or $95^{th}$ percentile
β_daily = buffer value for per day prediction, it tends to be lower than the yearly buffer
capacity_provisioned_daily = daily provisioned value, sum of aggregate and buffer
|1...M> = one's vector with length equals to |predicted_series_daily>, 'M' indicates dimension
|provisioned_series_daily> = product of one's vector and daily provisioned value
|provisioned_unutilized_daily> = the vector having list of unutilized capacity values for each period, with reference to provisioned capacity for entire prediction window f
total_provisioned_utilized_daily = total sum of utilized quantity for the entire prediction window f
total_provisioned_unutilized_daily = total sum of unutilized quantity for the entire prediction window f
ε = standard capacity price
δ = on-demand capacity price
$daily = savings threshold, e.g., 5-10$
S_cost_daily = Total costs incurred for standard capacity for entire period f
OD_cost_daily = Total costs incurred for on-demand capacity for entire period f
aggr_func, sum_func, DL_prediction_func = statistical aggregation, sum and deep-learning based prediction function respectively
Note:
- The historical data h may be 30 days or more
- The prediction window f may span across a day
- Variables represented in the formula above in the form of "| >" are vector data types

Autoscaling Mode Evaluation Logic
If (capacity_mode_selected == "Standard") then check_autoscaling( )
check autoscaling( )
{
    If ((capacity bandwidth * ε) / cloud watch alarm costs >= cutoff ratio):
    then:    capacity_mode_selected <= "Autoscaling"
    else:    capacity_mode_selected <= "Standard"
}
Where,
ε = standard capacity price
cutoff_ratio can be defined by user, e.g., 100: 1

Optionally, upon determining to execute a capacity configuration optimization for the database container, the CCOL 300 may output its optimization recommendations as a CCO token 252. The prescriptive engine layer 250 may send the CCO token 252 to a host interface for management of the database containers. For example, the CCO token may include a logic reconfiguring the capacity configuration of the database container, which may include updating the capacity mode and rightsizing the capacity throughput provisioned for the database container. The host interface may include an Application Programming Interface (API) for reconfiguring the capacity configuration of a database container and execute the CCO token with the API to reconfigure the capacity configuration of the database container.

Optionally, the CCOL 300 may execute the similar operations at the prescriptive engine layer 250 to output respective capacity configuration optimization recommendations for each of the database containers undergoing the capacity configuration optimization analysis. Upon the capacity configuration optimization recommendations are output, the CCOL 300 then may, at the prescriptive engine layer 250, store the capacity configuration optimization recommendations via a memory operation at the data staging layer 205 (330).

Now referring to the presentation layer 260 in FIG. 2, where the CCOL 300 may access the optimization recommendations from the prescriptive engine layer 250, e.g., via data staging layer 205 memory operations to generate a CCO-control interface 266 including a CCO-window presentation 268 (332).

Figure 5A:
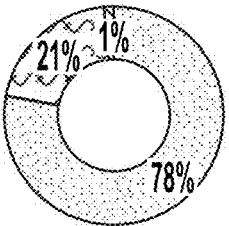
Figure 6A:
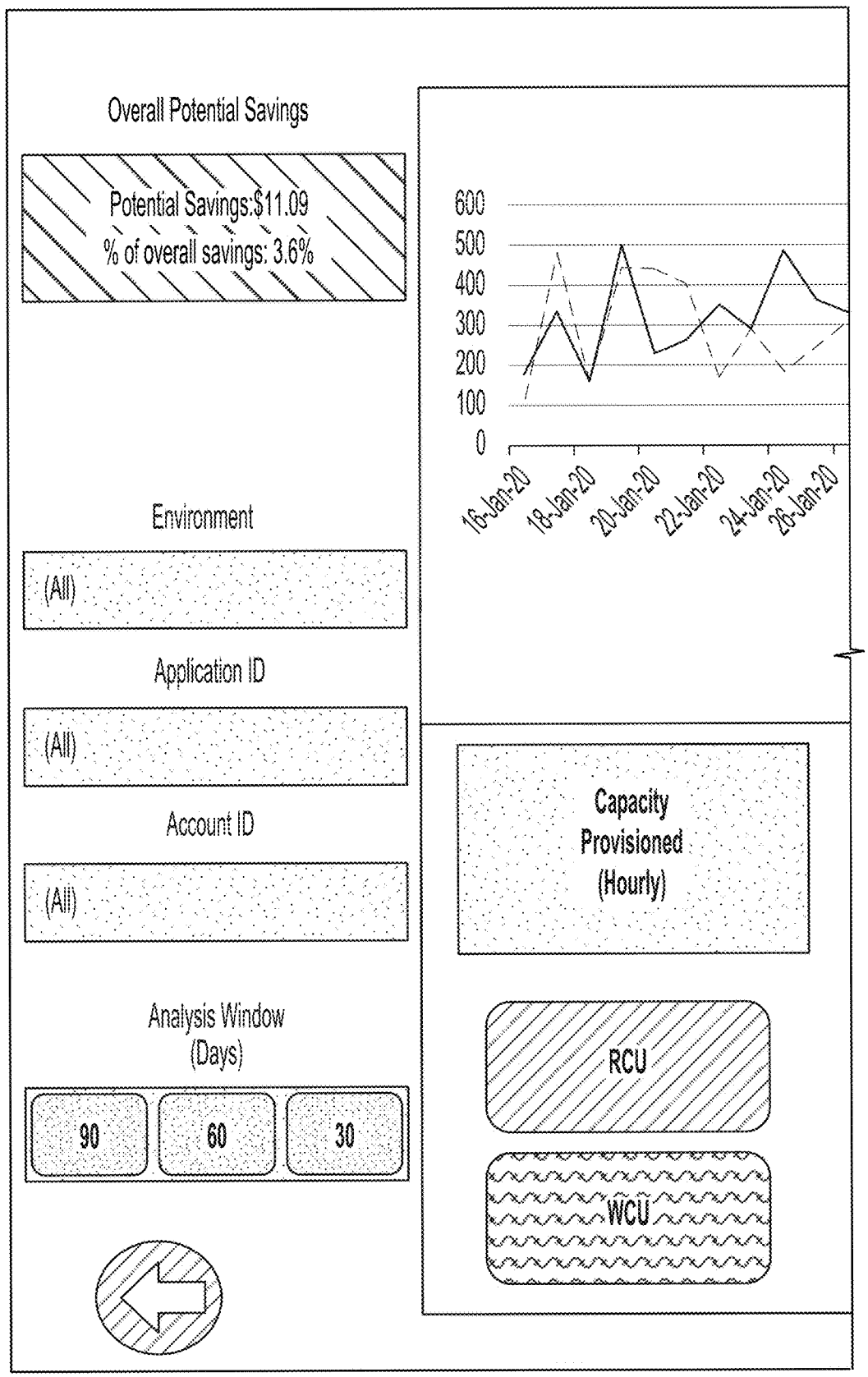
FIGS. 6A-6C show a second example processing capacity configuration optimization control interface.
Figure 6B:
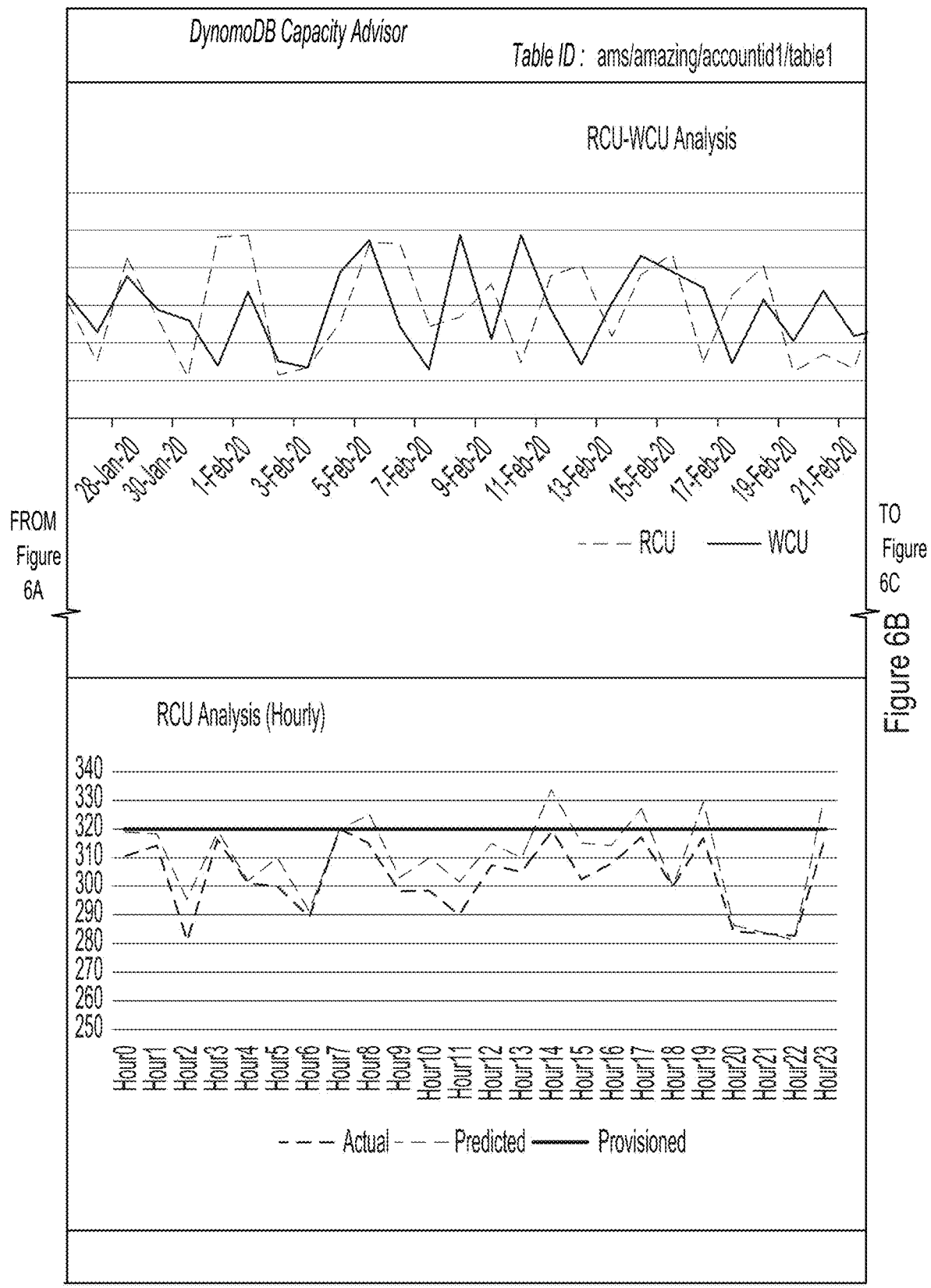
Figure 6C:
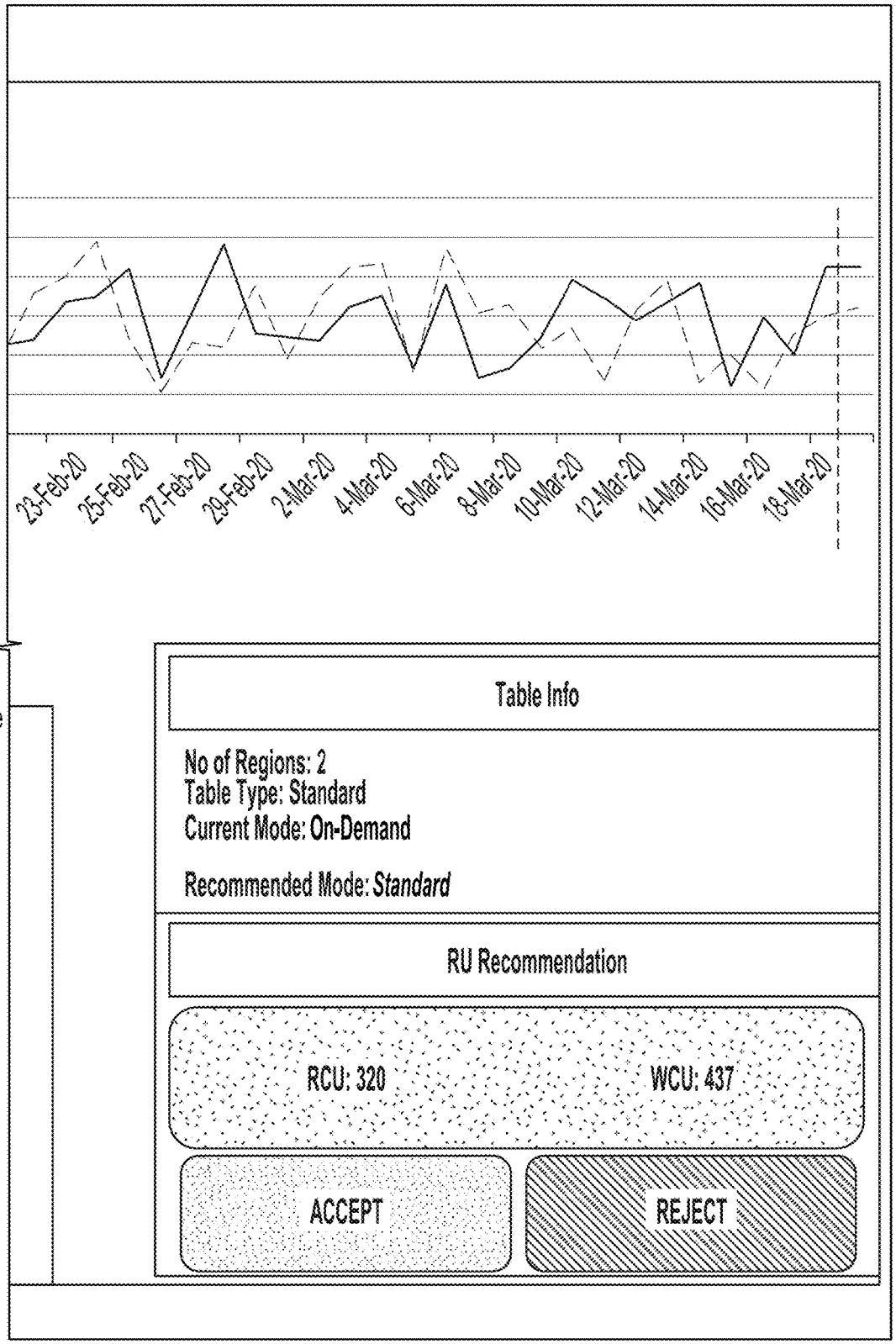

The CCO-window presentation 268 may include data and/or selectable options related to the optimization recommendations. In an implementation, the CCO-window presentation 268 may be configured to display prescriptive analysis information with regard to the capacity configuration optimization. For example, FIGS. 5A-5C illustrate an example of the capacity configuration optimization analysis preview by database container including, for example, the capacity mode and capacity throughput recommendations and potential savings. FIGS. 5A-5C also illustrate an example of a capacity configuration optimization priority for the database containers in accordance with their potential savings. FIGS. 6A-6C illustrates an example of a detailed capacity configuration optimization analysis for a specific database container including, for example, the current capacity mode, the recommended capacity mode, the historical provisioned/consumed capacity throughputs including the read capacity unit and the write capacity unit, the predicted capacity throughputs preview for the database container, and the recommended read capacity unit and write capacity unit.

Further, an option to forward a CCO token, to a host interface for capacity configuration optimization in accord the recommendations may be included as one of the selectable options available through the CCO-window presentation 268. Alternatively or additionally, an option to configure the CCO interval used for the capacity configuration optimization analysis may be included as a portion of the selectable options available through the CCO-window, as illustrated in FIGS. 6A-6C.

Figure 7:
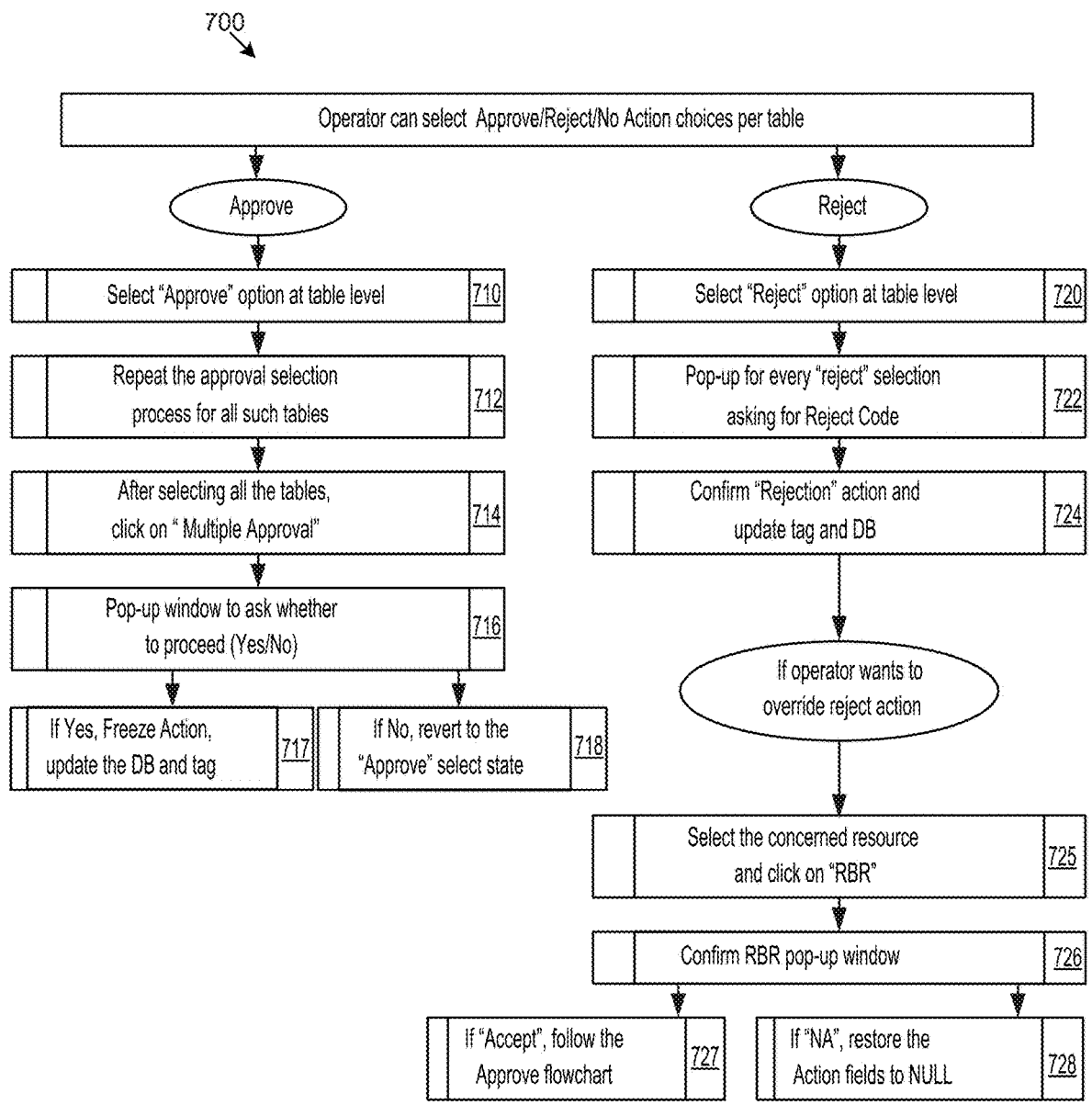
FIG. 7 shows an example interaction logic with a processing capacity configuration optimization control interface in accordance with an embodiment.

Additionally or alternatively, the CCO-window presentation may include an option to approve/reject one or more (or all of) the capacity configuration optimization recommendations. FIG. 7 shows an example interaction logic between input signals received from an operator and the CCO-window presentation 268 to approve/reject the displayed optimization recommendations. Specifically, the operator may take approval/rejection action per database container in the CCO-window presentation 268.

For example, the CCO-window presentation 268 may include "Approve," "Reject," and "No action" options for each of the database containers such as database tables. The operator may select "Approve" option at container level (710) and repeat the "Approve" selection for other tables (712). After finishing the option selections for all the tables, the operator may click on "Multiple Approval" option (714). As response, the CCO-window presentation 268 may pop-up a window to ask the operator to confirm to proceed with "Yes" and/or "No" options (716). If the operator selects "Yes" option, the CCO-window presentation 268 may freeze action in the window and update the operator's inputs in the background storage storing the inputs (717). If the operator selects "No" option, the CCO-window presentation 268 may revert to the "Approve" selection state (718).

The operator may also select "Reject" option at container level (720). For each "Reject" selection, the CCO-window presentation 268 may pop up a window to ask for a rejection code justifying the rejection (722). Where the rejection code is verified, the CCO-window presentation 268 may confirm the rejection action and update the operator's inputs in the background storage (724).

Optionally, if the operator would like to override his/her previous rejection action, the operator may select the concerned database containers and click "RBR" (Roll Back Required) option (725). As response, the CCO-window presentation 268 may pop up a window to confirm the "RBR" selection with "Accept" and "NA" (Not Accept) options (726). If the operator selects "Accept" option, the CCO-window presentation 268 may enable to select the "Approve" option for the concerned database containers (727). If the operator selects "NA", the CCO-window presentation 268 may nullify all the selection actions with respect to the concerned database containers (728).

Through the interaction with the operator via the CCO-control interface, the CCOL 300 may perform a capacity configuration determination on whether to execute, based on the recommended capacity configuration, a capacity configuration optimization for the database container (334). Where the CCOL 300 determines to execute the capacity configuration optimization, the CCOL 300 may generate a CCO token 252 based on the recommended capacity configuration (336). The CCO token may, for example, include logic reconfiguring the capacity configuration for the target database container with the recommended capacity mode and the recommended capacity throughput.

After generation of the CCO token 252, the CCOL 300 may initiate deployment of the CCO token 252 by sending the CCO token 252 to the network interface circuitry (e.g., the network interface circuitry 812) and causing the network interface circuitry to send the CCO token 252 to a host interface for capacity configuration optimization (338). For example, services such as Amazon® Web Services (AWS), Cloudian®, Microsoft® AZURE, or other cloud computing services, may maintain host interfaces (e.g., web interfaces, application programming interfaces, or other interfaces) by which cloud user/system operator may manage the database containers.

In some cases, the CCOL 300 may initiate deployment via the data export layer 270. The data export layer 270 may format the reservation matrix in one or more formats for transfer. For example, the data export layer 270 may support format translation to java script object notation (JSON), extensible markup language (XML), comma separated value (CSV), Tableau Workbook (TBWX), hypertext markup language (HTML) or other formats. The data export layer 270 may also support transfer of the CCO token in one or more states, such as flat file transfers, streaming transfers, web service access, internet protocol transfers, or other transfers. Additionally or alternatively, the CCOL 300 may initiate deployment via the prescriptive engine layer 250 through direct transfer, direct network access, or other non-export transfer.

Figure 8:
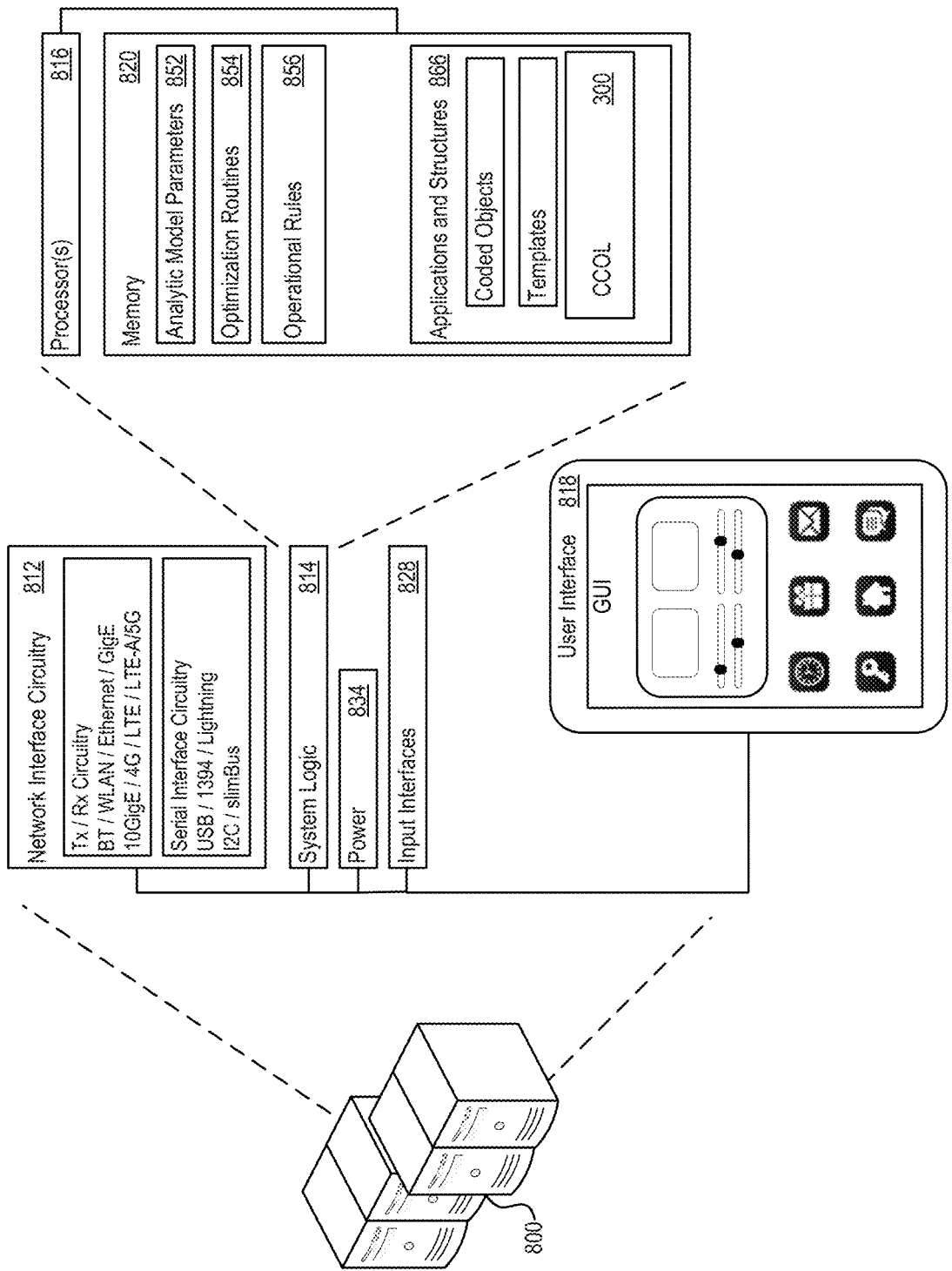
FIG. 8 shows an example system execution environment for the processing capacity configuration optimization stack.

FIG. 8 shows an example system execution environment 800 for the CCO stack 200 described above. The execution environment 800 may include system logic 814 to support execution of the multiple layers of CCO stack 200 described above. The system logic may include processors 816, memory 820, and/or other circuitry.

The memory 820 may include analytic model parameters 852, optimization routines 854, and operational rules 856. The memory 820 may further include applications and structures 866, for example, coded objects, machine instructions, templates, or other structures to support pre-processing the utilization tracking data, predicting database container capacity utilizations, selecting the recommended capacity mode, or other tasks described herein. The applications and structures 866 may implement at least part of the CCOL 300.

The execution environment 800 may also include network interface circuitry 812, which may support wireless, e.g. Bluetooth, Wi-Fi, WLAN, cellular (4G, LTE/A, 5G), and/or wired, Ethernet, Gigabit Ethernet, optical networking protocols. The network interface circuitry 812 may also include serial interfaces, such as universal serial bus (USB), serial ATA, IEEE 1394, lighting port, $I^2C$, slimBus, or other serial interfaces. The network interface circuitry 812 may be used to support and/or implement remote operation of the CCO-control interface 266. The execution environment 800 may include power functions 834 and various input interfaces 828. The execution environment may also include a user interface 818 that may include human-to-machine interface devices and/or graphical user interfaces (GUI). The user interface 818 may be used to support and/or implement local operation of the CCO-control interface 266. In various implementations, the system logic 814 may be distributed over one or more physical servers, be implemented as one or more virtual machines, be implemented in container environments such as Cloud Foundry or Docker, and/or be implemented in Serverless (functions as-a-Service) environments.

In some cases, the execution environment 800 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the CCO stack 200, of the execution environment onto the hardware resources. In some cases, a manifest may be stored as a preference file such as a YAML (yet another mark-up language), JSON, or other preference file type. Additionally or alternatively, the manifest may include custom scripts to implement the CCO stack 200 in a serverless environment. Therein, a multiple-tier framework is described. The framework describes a series of the serverless tasks controlled via scripts. The serverless tasks overlap in execution to maintain continuity across the tasks. The computational task in divided into chunks that may be handled by individual serverless tasks. Accordingly, a complex analytic process, such as those describe in this disclosure, may be divided into chunks and executed over one or more overlapping serverless tasks.

The methods, devices, processing, circuitry, and logic described above may be implemented in many different ways and in many different combinations of hardware and software. For example, all or parts of the system, including the network interface circuitry and the optimization circuitry, may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible database container medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a database container medium and instructions stored in or on the medium, and the instructions when executed by the circuitry in a device may cause the device to implement any of the processing described above or illustrated in the drawings.

Implementations of the system may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system comprising:
   network interface circuitry configured to:
   receive utilization tracking data for a database container in a NoSQL database, the database container configured with a processing capacity configuration, the processing capacity configuration comprising one of a plurality of predetermined capacity modes, each of the capacity modes representing a different manner to provision processing capacity on the database container; and send a capacity configuration optimization (CCO) token to a host interface, the host interface configured to execute the CCO token to reconfigure the database container with a recommended capacity mode;
optimization circuitry in data communication with the network interface circuitry, the optimization circuitry configured to execute a CCO stack, the CCO stack executable to:
at a prescriptive engine layer of the CCO stack:
obtain capacity utilization data from the utilization tracking data;
aggregate the capacity utilization data according to a predetermined time granularity;
for each of a plurality of subintervals of a CCO interval, predict, with a prediction engine, based on the aggregated capacity utilization data, respective prediction-based processing capacity utilizations for the database container, each of the plurality of subintervals having the predetermined time granularity;
determine a target processing capacity utilization value from the prediction-based processing capacity utilizations;
calculate respective provisioned processing capacity utilizations for each of the subintervals over the CCO interval based on the target processing capacity utilization value;
select one of the capacity modes as the recommended capacity mode based on the prediction-based processing capacity utilizations and the provisioned processing capacity utilizations;
generate the CCO token based on the recommended capacity mode; and
send the CCO token to the host interface via the network interface circuitry.

2. The system of claim 1, wherein the optimization circuitry is configured to:
evaluate a first consumption metric of the database container under a first capacity mode included in the capacity modes, the first consumption metric being evaluated based on the prediction-based processing capacity utilizations and the provisioned processing capacity utilizations;
evaluate a second consumption metric of the database container under a second capacity mode included in the capacity modes, the second consumption metric being evaluated based on the prediction-based processing capacity utilizations; and
select one of the first capacity mode or the second capacity mode as the recommended capacity mode based on the first consumption metric and the second consumption metric.

3. The system of claim 2, wherein the processing capacity configuration further comprises a capacity throughput, the capacity throughput representing a processing capacity provisioned on the database container to process data per unit time, the optimization circuitry is further configured to:
determine a recommended capacity throughput based on the recommended capacity mode.

4. The system of claim 3, wherein the capacity modes comprise:
an on-demand mode that dynamically provisions the database container with the capacity throughput based on workloads of the database container;
a standard mode that provisions the database container with a first specified capacity throughput;
an auto-scaling mode that provisions the database container with a second specified capacity throughput and automatically increases or decreases the second specified capacity throughput in response to a predetermined condition being satisfied; or
a reserved mode that reserves a specified capacity throughput for the database container over at least a predetermined period of time.

5. The system of claim 4, wherein the optimization circuitry is configured to:
add a processing capacity utilization buffer to the target processing capacity utilization value to obtain a buffered processing capacity utilization value;
determine the recommended capacity throughput as the buffered processing capacity utilization value in response to the recommended capacity mode being the standard mode or the reserved mode; and
determine the recommended capacity throughput as zero in response to the recommended capacity mode being the on-demand mode.

6. The system of claim 4, wherein the optimization circuitry is further configured to:
in response to the recommended capacity mode being the standard mode,
calculate a consumption ratio based on the recommended capacity throughput and an alarm consumption metric indicative of excessive usage of the capacity throughput; and
update the recommended capacity mode to the auto-scaling mode in response to the consumption ratio being greater than or equal to a cutoff ratio.

7. The system of claim 4, wherein the optimization circuitry is further configured to:
generate a consumption optimization preview for the database container based on the recommended capacity mode and the recommended capacity throughput, the consumption optimization preview indicating a decrease of a consumption metric of the database container due to the capacity configuration optimization; and
determine a priority to execute the capacity configuration optimization for the database container based on the consumption optimization preview.

8. The system of claim 4, wherein the optimization circuitry is further configured to:
obtain a utilization time length for the database container; and
determine the first capacity mode and the second capacity mode based on the utilization time length.

9. The system of claim 8, wherein the optimization circuitry is configured to:
in response to the utilization time length being greater than a first utilization time length threshold and less than or equal to a second utilization time length threshold, determine the first capacity mode as the standard mode and the second capacity mode as the on-demand mode; and
in response to the utilization time length being greater than the second utilization time length threshold, determine the first capacity mode as the reserved mode and the second capacity mode as the on-demand mode.

10. The system of claim 9, the optimization circuitry is configured to:
select the on-demand mode as the recommended capacity mode in response to the utilization time length being less than or equal to the first utilization time length threshold.

11. The system of claim 9, wherein the optimization circuitry is configured to:
select the first capacity mode as the recommended capacity mode in response to the second consumption metric being a predetermined consumption metric threshold greater than the first consumption metric.

12. The system of claim 9, wherein the optimization circuitry is further configured to:
execute the prediction engine as a long-term deep learning model to predict respective prediction-based processing capacity utilizations in response to the utilization time length being greater than the second utilization time length threshold; and
execute the prediction engine as a short-term deep learning model to predict respective prediction-based processing capacity utilizations in response to the utilization time length being greater than a first utilization time length threshold and less than or equal to the second utilization time length threshold;
wherein the long-term deep learning model and the short-term deep learning model are trained to predict the prediction-based processing capacity utilizations for the database container.

13. The system of claim 1, wherein the optimization circuitry is configured to:
add a predetermined processing capacity utilization buffer to the target processing capacity utilization value to obtain a buffered processing capacity utilization value; and
calculate each of the respective provisioned processing capacity utilizations as being equal to the buffered processing capacity utilization value.

14. The system of claim 1, wherein the target processing capacity utilization value is greater than processing capacity utilization values of a predetermined portion of the prediction-based processing capacity utilizations.

15. The system of claim 14, the optimization circuitry is further configured to:
determine the target processing capacity utilization value as a Nth percentile processing capacity utilization value of the prediction-based processing capacity utilizations, wherein the Nth percentile is greater than or equal to a 95th percentile.

16. The system of claim 1, wherein:
the CCO stack is further executable to, at a presentation layer of the CCO stack, generate a CCO control interface including a CCO-window presentation; and
the CCO-window presentation includes a selectable option to execute the capacity configuration optimization.

17. The system of claim 16, wherein the CCO-window presentation further includes a selectable option to reject execution of the capacity configuration optimization.

18. The system of claim 16, wherein the CCO-window presentation is configured to display multiple capacity configuration optimizations, each of the multiple capacity configuration optimizations for a corresponding database container.

19. A method comprising:
receiving, at network interface circuitry, utilization tracking data for a database container in a NoSQL database, the database container configured with a processing capacity configuration, the processing capacity configuration comprising one of a plurality of predetermined capacity modes, each of the plurality of capacity modes representing a different scaling of processing capacity on the database container; a manner to provision processing capacity
executing a capacity configuration optimization (CCO) stack at optimization circuitry, the optimization circuitry in data communication with the network interface circuitry, wherein executing the CCO stack comprises:
obtaining, at a prescriptive engine layer of the CCO stack, capacity utilization data from the utilization tracking data;
aggregating, at the prescriptive engine layer, the capacity utilization data according to a predetermined time granularity;
for each of a plurality of subintervals, having the predetermined time granularity, over a CCO interval, predicting respective prediction-based processing capacity utilizations for the database container, the respective prediction-based processing capacity utilizations predicted with a prediction engine, at the prescriptive engine layer, based on the aggregated capacity utilization data;
determining, at the prescriptive engine layer, a target processing capacity utilization value from the prediction-based processing capacity utilizations;
calculating, at the prescriptive engine layer, respective provisioned processing capacity utilizations for each of the subintervals over the CCO interval based on the target processing capacity utilization value;
evaluating, at the prescriptive engine layer, a consumption metric of the database container based on the prediction-based processing capacity utilizations and the provisioned processing capacity utilizations;
selecting, at the prescriptive engine layer, one of the plurality of capacity modes as a recommended capacity mode based on the consumption metric; generating, at the prescriptive engine layer, a CCO token based on the recommended capacity mode; and
sending, via the network interface circuitry, the CCO token to a host interface configured to execute the CCO token to reconfigure the database container with the recommended capacity mode.

20. A product including:
machine-readable media other than a transitory signal; and
instructions stored on the machine-readable media, the instructions configured to, when executed, cause a machine to:
at network interface circuitry:
receive, at network interface circuitry, utilization tracking data for a database container in a NoSQL database, the database container configured with a processing capacity configuration, the processing capacity configuration comprising one of a plurality of predetermined capacity modes, each of the capacity modes representing a different scaling of processing capacity on the NoSQL database container;
at optimization circuitry in data communication with the network interface circuitry, the optimization circuitry executing a capacity configuration optimization (CCO) stack:
obtain, at a prescriptive engine layer of the CCO stack, capacity utilization data from the utilization tracking data;

aggregate, at the prescriptive engine layer, the capacity utilization data according to a predetermined time granularity;

for each of a plurality of subintervals having the predetermined time granularity over a CCO interval, predict respective prediction-based processing capacity utilizations for the database container, the respective prediction-based processing capacity utilizations predicted at the prescriptive engine layer based on the aggregated capacity utilization data;

determine, at the prescriptive engine layer, a target processing capacity utilization value from the prediction-based processing capacity utilizations;

calculate, at the prescriptive engine layer, respective provisioned processing capacity utilizations for each of the subintervals over the CCO interval based on the target processing capacity utilization value;

select, at the prescriptive engine layer, one of the capacity modes as a recommended capacity mode based on the prediction-based processing capacity utilizations and the provisioned processing capacity utilizations;

generate, at the prescriptive engine layer, a CCO token based on the recommended capacity mode; and send, via the network interface circuitry, the CCO token to a host interface configured to execute the CCO token to reconfigure the database container with the recommended capacity mode.

* * * * *

UNITED STATES PATENT AND TRADEMARK OFFICE
CERTIFICATE OF CORRECTION

| | |
|---|---|
| PATENT NO. | : 11,321,142 B2 |
| APPLICATION NO. | : 16/901861 |
| DATED | : May 3, 2022 |
| INVENTOR(S) | : Madhan Kumar Srinivasan et al. |

It is certified that error appears in the above-identified patent and that said Letters Patent is hereby corrected as shown below:

In the Specification

Column 15, in Table 1-continued, 22$^{nd}$ Line under "Description", delete "[provisional_series_daily>" and replace with --|provisional_series_daily>--.

Column 15, in Table 1-continued, 7$^{th}$ Line from the bottom at end of line, delete "cutoff ratio):" and replace with --cutoff_ratio):--.

Signed and Sealed this
Seventh Day of June, 2022

*Katherine Kelly Vidal*

Katherine Kelly Vidal
*Director of the United States Patent and Trademark Office*